(12) United States Patent
Allison, III

(10) Patent No.: US 12,226,714 B2
(45) Date of Patent: Feb. 18, 2025

(54) HYDROGEN SULFIDE MITIGATION METHODS AND SYSTEMS

(71) Applicant: Viro Petroleum & Energy, LLC, Conroe, TX (US)

(72) Inventor: Robert D. Allison, III, Conroe, TX (US)

(73) Assignee: Viro Petroleum & Energy, LLC, Conroe, TX (US)

( * ) Notice: Subject to any disclaimer, the term of this patent is extended or adjusted under 35 U.S.C. 154(b) by 0 days.

(21) Appl. No.: 18/507,241

(22) Filed: Nov. 13, 2023

(65) Prior Publication Data
US 2024/0082754 A1    Mar. 14, 2024

Related U.S. Application Data

(63) Continuation of application No. 17/874,067, filed on Jul. 26, 2022, now Pat. No. 11,813,551.

(60) Provisional application No. 63/281,800, filed on Nov. 22, 2021.

(51) Int. Cl.
*B01D 19/00* (2006.01)
*B01D 53/52* (2006.01)
*B01D 53/82* (2006.01)

(52) U.S. Cl.
CPC ......... *B01D 19/0005* (2013.01); *B01D 53/52* (2013.01); *B01D 53/82* (2013.01); *B01D 2221/08* (2013.01); *B01D 2251/602* (2013.01)

(58) Field of Classification Search
CPC .... B01D 19/0005; B01D 53/52; B01D 53/82; B01D 2221/08; B01D 2251/602; B01D 2253/1124
See application file for complete search history.

(56) References Cited

FOREIGN PATENT DOCUMENTS

WO    WO-2021142553 A1 *  7/2021  ......... B01D 53/1468

OTHER PUBLICATIONS

Yaro et al , Sulfide Scavengers in Oil and Gas Industry—A review, NAFTA 61, 2 , pp. 85-92 (Year: 2010).*

* cited by examiner

*Primary Examiner* — Randy Boyer
*Assistant Examiner* — Juan C Valencia
(74) *Attorney, Agent, or Firm* — HILL, KERTSCHER & WHARTON, LLP; Gregory T. Ourada

(57) ABSTRACT

The methods and embodiments described herein involve installation of a gas sparging manifold into crude oil storage tanks, which facilitates removal of hydrogen sulfide ($H_2S$) from bulk crude oil. Hydrogen sulfide stripped from the crude oil is scavenged via a forced-draft scavenging gas into a scavenging duct, and passes through an in-line filter. An alternative embodiment can be adapted for mobile use in a tank trailer/tank car capable of being towed by a tractor truck or locomotive.

10 Claims, 6 Drawing Sheets

HYDROGEN SULFIDE MITIGATION METHODS AND SYSTEMS

CROSS REFERENCE TO RELATED APPLICATIONS

This application is a continuation of application Ser. No. 17/874,067 filed Jul. 26, 2022, now U.S. Pat. No. 11,813,551, which claims priority to Appl. Ser. No. 63/281,800 filed Nov. 22, 2021.

BACKGROUND

The $H_2S$ solutions described herein are applicable to the upstream and midstream segments of petroleum production, i.e. involving the storage and transportation of sour crude from the wellhead (i.e. upstream) to refineries (i.e. downstream). Hydrogen sulfide ($H_2S$) is a colorless gas that poses a considerable problem in the energy industry due to its presence in crude oil. At low concentrations, $H_2S$ exhibits a characteristically unpleasant "rotten egg" smell. At moderate concentrations, it can result in nerve and respiratory damage. $H_2S$ in high concentrations is instantly fatal, and it was used on a limited basis in World War I as a chemical weapon. $H_2S$ may also have contributed to "Gulf War Syndrome" characterized by chronic fatigue, headaches, dizziness, memory problems, which were experienced by military personnel who were exposed to fumes from burning oil wells in the Gulf War of 1991. $H_2S$ in high concentrations is also flammable and highly corrosive.

Crude oil containing a sulfur content in excess of 0.5%, or that otherwise fails to meet specified thresholds for hydrogen sulfide is classified as "sour". Sour crude costs more to refine and is therefore less desirable as a commodity than "sweet" crude, which is defined by the New York Mercantile Exchange as crude oil containing sulfur levels below about 0.5%.

$H_2S$ gas is formed when a biological agent breaks down anaerobically. In crude oil, these biological agents either are naturally present in the crude oil deposit, or they may be introduced when water (e.g., seawater) is introduced into a well as a pressurizing agent. As a result, the $H_2S$ content in sweet crude production wells can sometimes increase without warning.

Sour crude oil containing high $H_2S$ levels is also classified by government agencies such as the U.S. Occupational Safety and Health Administration (OSHA), and the Pipeline and Hazardous Materials Safety Administration (PHMSA) as a hazardous material, because it is toxic, flammable, and corrosive. Transportation, storage, and processing of sour crude oil is more difficult and expensive than for sweet crude because it tends to corrode tanks, piping, and valves used to transport sour crude. Furthermore, it is necessary to avoid volatility in the void at the top of crude oil storage tanks that can be caused by high concentrations (about 43,000 ppm) of $H_2S$ or high pressures. This poses an often-intractable problem for midstream operators (i.e. rail, truck, and pipeline facilities). As a result, most midstream operators new require low $H_2S$ content (e.g. less than 5 parts per million [ppm]) in crude oil and condensate. Current H2S control techniques focus on either slowing the rate of formation of H2S or removing H2S once it has formed. However, all of these techniques are not well-suited to upstream and midstream applications. One application, described in EP 0432858A1 involves use of a stripping gas in a stripping column into which sour crude is supplied. The crude oil then flows into a storage tank where "liberated gas components are discharged from the tank as waste gas". U.S. Pat. Nos. 7,727,316 and 7,773,990 disclose a modular system involving aeration of $H_2S$-contaminated "process fluids" used in well drilling combined with centrifugal agitation of the aerated process fluids to remove $H_2S$. However, these systems do not directly address the issue of $H_2S$-contaminated crude oil.

As a result, certain wells containing an abundance of crude oil, yet with high levels of $H_2S$ may not be economically viable due to $H_2S$ mitigation costs, leading to the problem of "orphan wells" which would otherwise be productive but for the $H_2S$ issue.

SUMMARY

The embodiments described below are designed to remove $H_2S$ either while in upstream storage facilities, or midstream during transportation. It is hoped that widespread application of these embodiments may allow orphan wells to become economically viable. Upstream embodiments involve retrofitting an existing crude oil storage tank at the wellhead with a sparging gas supply line connected to a sparging array submerged in crude oil stored in a storage tank. The sparging array is provided with pressurized sparging gas via a gas compressor through a manifold. The sparging gas facilitates separation of H2S gas from the crude oil. The H2S gas accumulates in the head space at the top of the storage tank.

An H2S sensor is located in the head space at the top of the tank and monitors H2S levels in ppm. The H2S sensor is electrically connected to the circulation fan, so that if the H2S levels exceed a certain predefined threshold, the circulation fan is activated, forcing additional ventilation gas through the headspace to remove excess H2S.

A ventilation gas duct installed in the headspace at the top of the crude oil storage tank is used to remove the stripped $H_2S$ gas by forcing gas into the headspace through a ventilation supply duct and removing the $H_2S$-laden gas through a return ventilation duct. The H2S-laden gas passes through an in-line filter where the H2S is removed. The in-line filter in certain embodiments employs a solid filtration media which chemically reacts with the $H_2S$ gas that has been removed from the crude oil mass. In one embodiment, the solid filtration media is hydrated ferrous oxide, which generates iron (II) sulfide and water according to the following chemical formula:

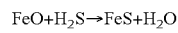

$FeO + H_2S \rightarrow FeS + H_2O$

The ventilation gas is then recirculated through the circulation fan back to the ventilation supply duct. Another embodiment employs a modified tank trailer that is used to transport crude from the wellhead to a trans-shipment terminal. The trailer in these embodiments is partitioned into a storage tank, and one or more auxiliary machinery compartments containing the filtration apparatus, sparging gas air compressor, and the circulation fan. Such a trailer would allow H2S removal while the product is being shipped to a trans shipment terminal. The tank trailer in certain embodiments includes a transfer pump and transfer piping, so that the product can be cross-loaded onto either another tank trailer, or railroad tank car at the transshipment terminal. Another embodiment envisions use of the mitigation system installed in a railroad tank car.

DETAILED DESCRIPTION OF PREFERRED EMBODIMENTS

The invention is described in preferred embodiments in the following description with reference to the Figures, in which like numbers represent the same or similar elements. Reference throughout this specification to "one embodiment", "an embodiment", or similar language means that particular feature, structure, or characteristic described in connection with the embodiment is included in at least one embodiment of the present invention. Thus, appearances of the phrases "in one embodiment", "in an embodiment", "in certain embodiments", and similar language throughout this specification may, but do not necessarily, all refer to the same embodiment. It is noted that, as used in this description, the singular forms "a", "an", and "the" include plural referents unless the context clearly dictates otherwise.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
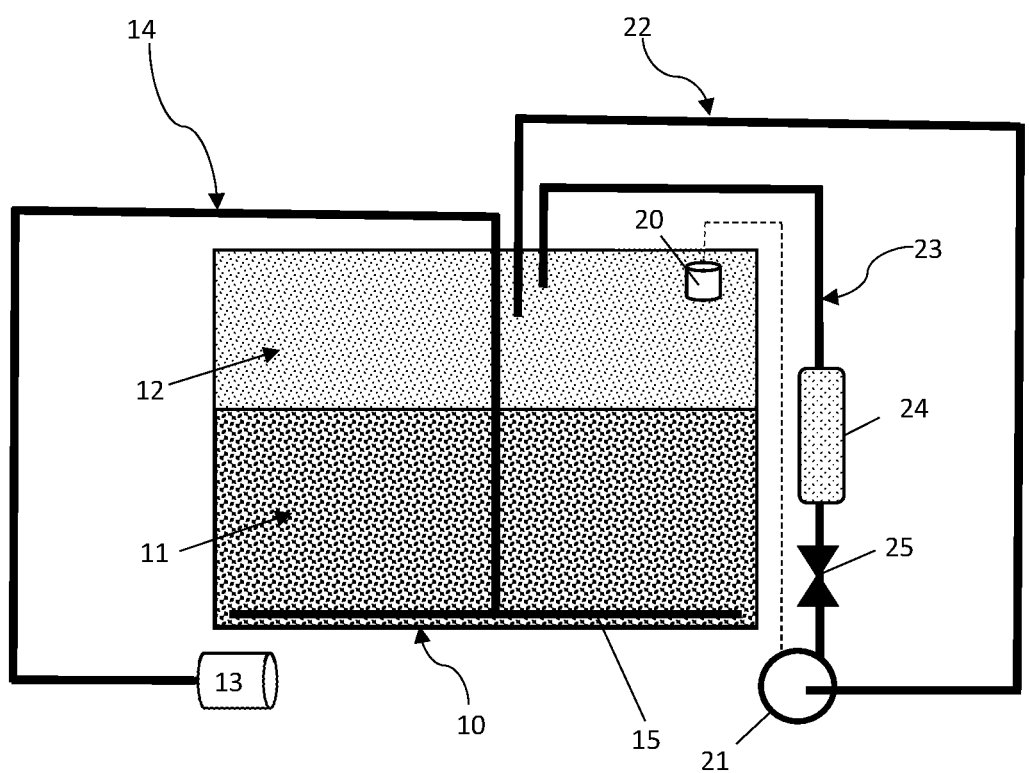
FIG. 1A is schematic view of a $H_2S$ stripping apparatus retrofitted in a crude oil storage tank according to one embodiment.
Figure 1B:
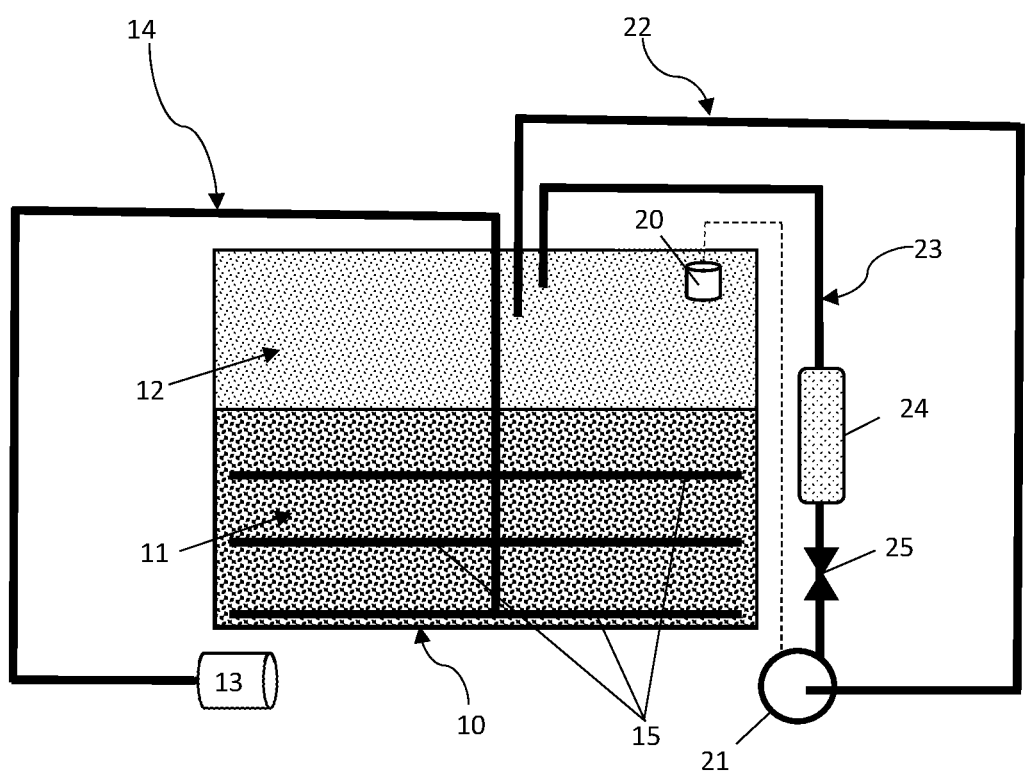
FIG. 1B is a schematic view of a H$_2$S stripping apparatus featuring a multi-level gas sparging assembly retrofitted in a crude oil storage tank according to another embodiment.

The embodiments of the system illustrated in FIGS. 1A and 1B are suitable for either retrofitting existing crude oil tanks or for installation in new-construction crude oil storage tanks. Crude oil storage tanks 10 contain crude oil mass 11 with a head space 12 at the top of the storage tank. A gas compressor 13 supplies pressurized sparging gas through a sparging gas supply line 14, which terminates at sparging assembly 15 that is located at the bottom of the tank. Gas compressor 13 in a preferred embodiment employs a brushless DC motor optimized for use in volatile environments and also may incorporate a pressurized accumulator tank. In certain embodiments where power may not be readily available, liquified or pressurized gas tanks may be used.

In the embodiment shown in FIG. 1A, only one sparging assembly 15 is shown. Other embodiments may feature multiple sparging assemblies stacked above each other at varying levels in the tank, with an example of such embodiments illustrated in FIG. 1B.

Figure 2A:
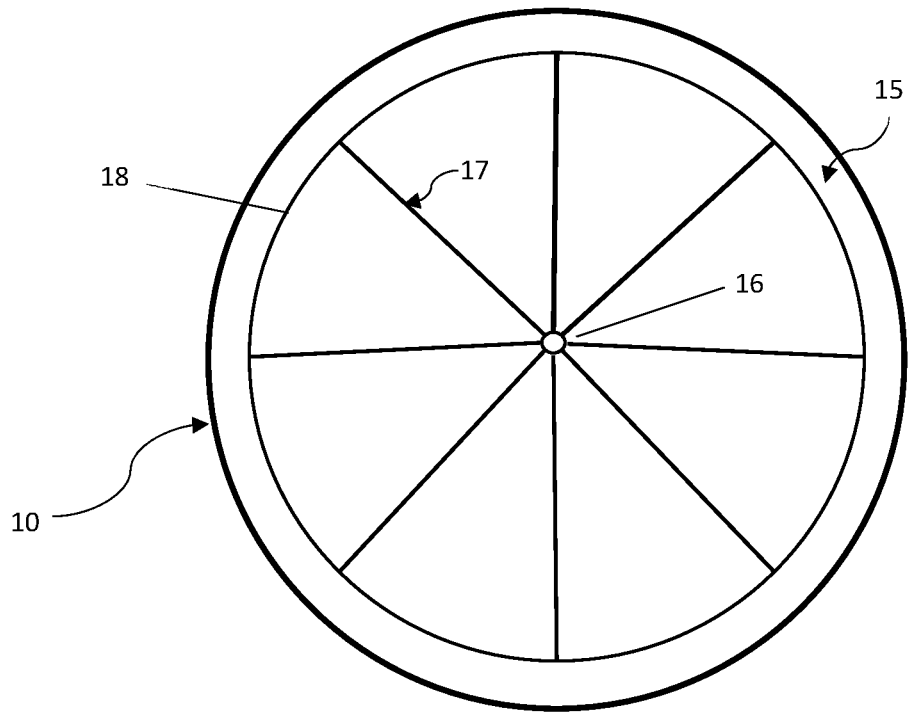
FIG. 2A is a plan view of a crude oil storage tank showing a "wagon wheel" configuration of the gas sparging assembly.

In the embodiments shown in FIGS. 1A and 1B, the sparging assembly 15 is in the "wagon wheel" configuration shown in plan view in FIG. 2A. Sparging assembly 15 comprises manifold hub 16, gas spargers 17, and rim 18. In the embodiment shown in FIGS. 1A-2A, the crude oil storage tank 10 is a vertically-oriented cylinder, so the sparging assembly 15 is circular to conform to the overall exterior shape of the tank. Rim 18 in some embodiments provides structural support only; the gas spargers 17 extend radially from manifold hub 16 to rim 18, where they are attached. In some embodiments, some sparging gas passes through gas spargers 17 to rim 18. Sparging assembly 15 in these embodiments is generally to be located at or near the lowest point in the tank, in order to achieve the most effective sparging process.

Figure 2B:
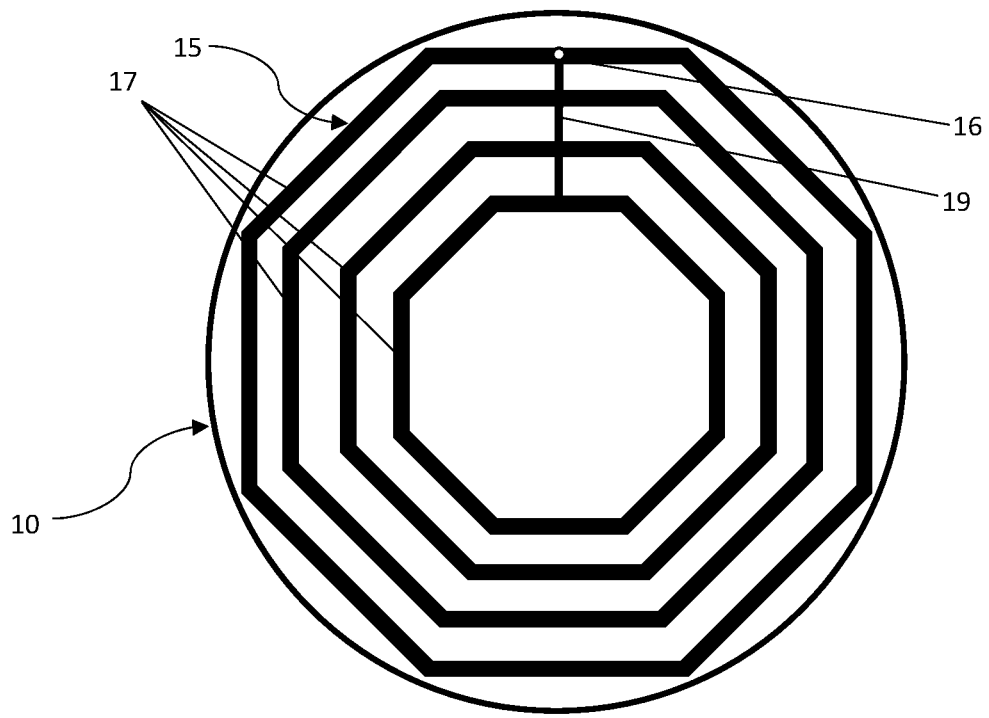
FIG. 2B is a plan view of a crude oil storage tank showing a concentric configuration of the gas sparging assembly.

Another embodiment of gas sparging assembly 15 is shown in FIG. 2B, which features concentric octagonal gas spargers 17.

Turning back to the embodiment shown in FIG. 2A, pressurized gas supply line 14 that is connected to the output of gas compressor 13 connects to sparging assembly 15 at the manifold hub 16 and pressurized gas flows from hub 16 into gas spargers 17. Gas spargers 17 feature a plurality of holes allowing pressurized gas to be released into the crude oil. Gas spargers in these embodiments may feature either lower-cost conventional drilled pipe, or more sophisticated perforated metal gas spargers such as those manufactured by Mott Corporation, which allow a large volume of gas with a very high specific area. In some embodiments, rim 18 is modified to perform as a gas sparger, with gas being supplied via gas spargers 17. Another embodiment of sparging assembly 15 is illustrated in FIG. 2B, where the gas spargers 17 are octagonally shaped and disposed concentrically at the bottom of storage tank 10. The gas spargers 17 in this embodiment are supplied pressurized sparging gas via manifold hub 16 and cross-connect supply lines 19.

Pressurized gas is supplied by low pressure gas compressor 13 at a pressure which both agitates the crude oil and encourages the release of H$_2$S vapor from the crude oil mass. This pressure is generally envisioned at 1-20 psia above ambient pressure, i.e. the hydrostatic pressure of the crude oil at the level of the gas spargers 17. It is desirable to limit the pressure supplied to the crude oil to the minimum necessary to agitate the crude oil in order to avoid exacerbating volatility/flammability issues and excess flocculation.

In certain embodiments, air can be used as a sparging gas. However, the oxygen content of air is undesirable in a highly flammable environment, so gases like CO$_2$, nitrogen and argon—which are both inert and naturally present in air, may be preferable as a sparging gas. A liquefiable gas such as CO$_2$ may be preferred for certain applications, due to its ability to be liquified, and its expansion ratio. This is an advantage in embodiments in which the low pressure gas compressor 13 is replaced by a liquefied gas tank. The reason for this replacement is due to energy requirements of the low pressure gas compressor. In embodiments using liquified gas, the expansion ratio of the gas is one of the factors in selection.

Referring again to FIGS. 1A and 1B, an H$_2$S sensor 20 is installed in the head space 12 at the top of storage tank 10. H$_2$S gas rising to the top of the tank is sensed by H$_2$S sensor 20. H$_2$S sensor 20 is electrically connected to a switch controlling circulation fan 21. Circulation fan 21, which is preferably a brushless DC fan motor of a type suitable for use in flammable environments, drives gas through supply duct 22. Supply duct 22 terminates in a vent located near the top of storage tank 10 H$_2$S sensor 20 monitors the concentration of H$_2$S gas in the tank head space 12. Sensor 20 generates and transmits an activation signal to circulation fan 21 when H$_2$S levels exceed a predetermined threshold. The lower explosive limit of H$_2$S is about 43,000 ppm, so to minimize risk of explosion, this threshold should preferably be set well below this level. Circulation fan 21 causes stripping gas to flow into the head space 12, where the H2S vapor is scavenged through return line 23. Return duct 23 is connected to an in-line $H_2S$ filter 24, which removes the H2S from the return gas prior to it returning to circulation fan 21.

There are a variety of methods for removing H2S vapor from gas. In preferred embodiments, H2S is chemically removed using an in-line filter 24 consisting of an outer casing containing a solid filtration media, as well as inlet and outlet ports for the return duct 23. In some preferred embodiments, this solid filtration media is ferrous oxide, which generates iron sulfide and water according to the following chemical formula:

$$FeO+H_2S \rightarrow FeS+H_2O$$

Figure 3:
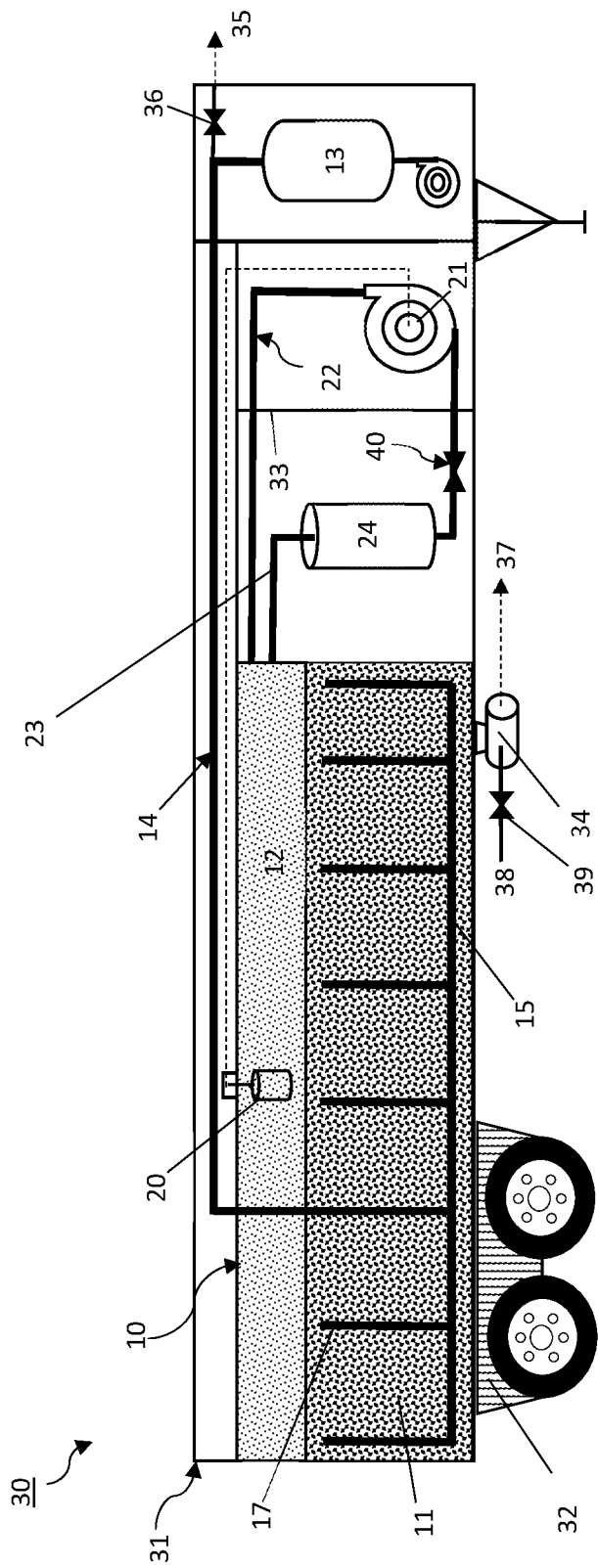
FIG. 3 is a schematic illustration of a mobile H$_2$S mitigation apparatus incorporated a tank trailer capable of being drawn by tractor truck.
Figure 4:
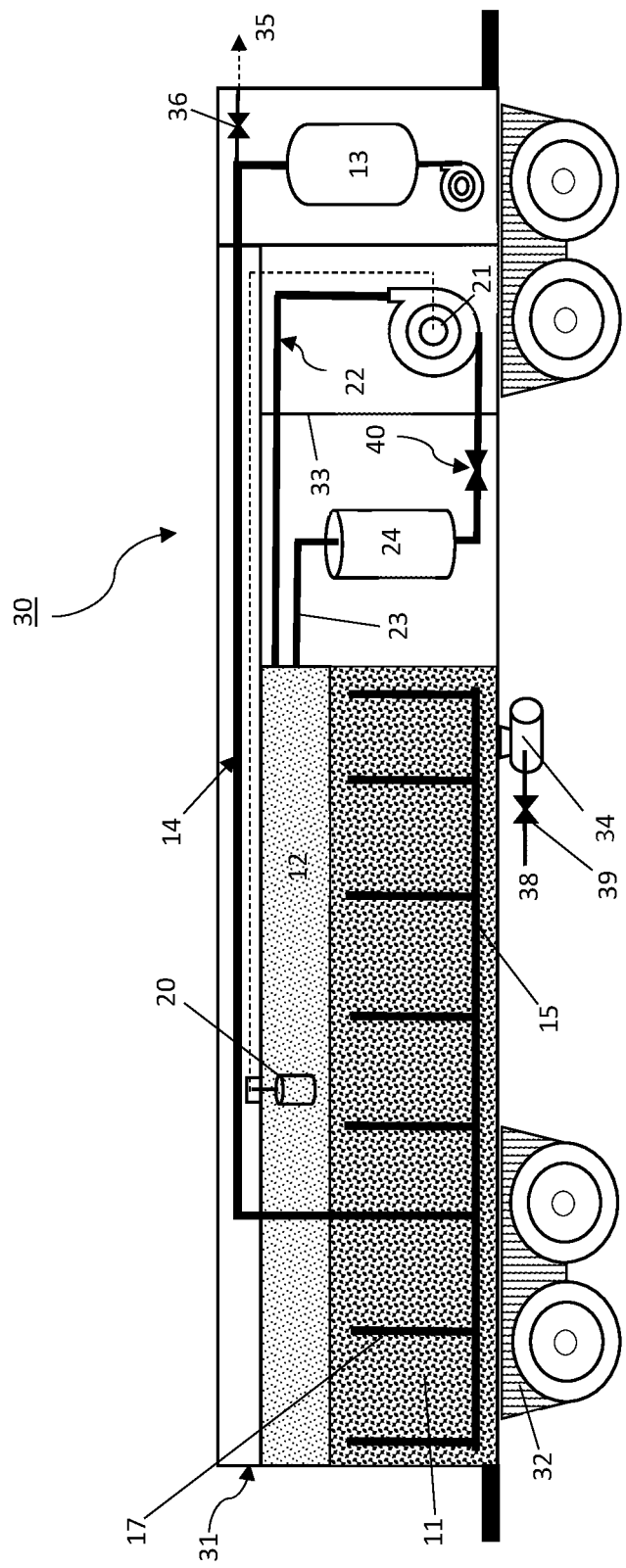
FIG. 4 is a schematic illustration of a mobile H$_2$S mitigation apparatus incorporated into a railroad tank car.
Figure 5:
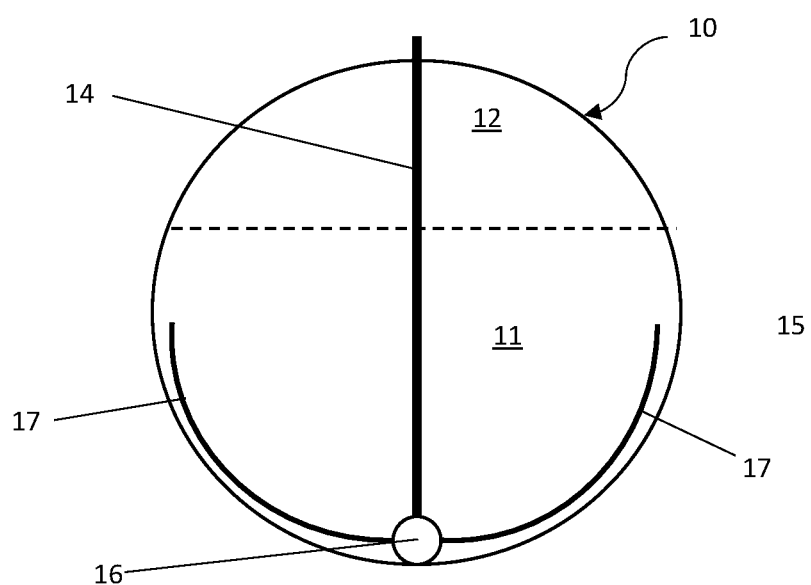
FIG. 5 is a cross-sectional view of the trailer embodiments illustrated in FIGS. 3 and 4 illustrating one configuration of the gas sparging assembly in these embodiments.

As mentioned above, sour crude oil is highly regulated as a hazardous material, which often makes transportation entirely impracticable. One solution to this problem is illustrated in FIG. 3, which is a mobile $H_2S$ remediation apparatus, which is incorporated into a standard highway tank trailer 30. An embodiment for a rail tank car is illustrated in FIG. 4. Trailer 30 comprises an enclosure 31 mounted on a transport chassis 32, which consists of structure supporting the enclosure, wheels, axles, etc. The configuration of storage tank 10 is similar to that shown in FIGS. 1A and 1B. Storage tank 10 contains crude oil 11, with head space 12 above the crude oil, and $H_2S$ sensor 20 located in the head space at the top of the tank. One difference from the embodiments illustrated in FIGS. 1A-2B is that the storage tank is generally cylindrical, but disposed horizontally, so that the curved edges are on the top, bottom and sides, instead of around the perimeter of the tank. This necessitates a change in the configuration of sparging assembly 15 that is shown in FIG. 5. In this embodiment, gas spargers 17 are attached on opposite sides of manifold hub 16, which is connected to sparging gas supply line 14. Gas spargers 17 generally follow the curvature of the sides of storage tank 10.

Gas compressor 13 is located in a compartment separate from to storage tank 10. as shown in FIGS. 3 and 4, additional sparging gas can be supplied externally using supply line 35, which interfaces directly with sparging gas supply line 14 via external gas supply valve 36. Circulation fan 21 is located in a separate compartment. In-line filter 24 is located in another separate compartment adjacent to storage tank 10. The compartments are separated by bulkheads 33. Additionally, the mobile embodiment features crude oil transfer pump 34. In certain instances, this pump may be powered by the tractor via auxiliary drive shaft 37. Crude oil that has been processed in transit to a transshipment facility may be directly transferred to another tank trailer via transfer connection 38 and transfer valve 39. Relief valve 40 is used to relieve overpressure. Relief valve 40 discharges into the internal compartment containing the in-line filter 24, which is also sealed to prevent inadvertent discharge of $H_2S$ into the atmosphere.

The materials comprising sparging gas supply line 14, gas sparging assemblies 15, manifold hub 16, supply duct 22, return duct 23, the tank vents associated with these ducts, and the $H_2S$ sensor must withstand the degrading effects of high concentrations of $H_2S$ gas. The materials comprising these components are susceptible to sulfide stress corrosion cracking (SCC), hydrogen-induced cracking, hydrogen embrittlement and exfoliation (HE-HIC) that ultimately leads to component failure due primarily to cracking. The materials selected for these components should therefore comply with ANSI/NACE standard MR0175/ISO 15156, the federally-mandated standards for selecting materials used in the presence of $H_2S$ gas in oil and natural gas production. While this standard does not specifically list approved materials, it provides a way to establish suitability of materials for use in high-concentration $H_2S$ environments. [1]

[1] Singh, Ramesh, "Material Selection for Sour Service Environment", *Pipeline & Gas Journal*, Vol. 237, No. 2, February 2010.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

It is noted that the terminology used above is for the purpose of reference only, and is not intended to be limiting. For example, terms such as "upper," "lower," "above," "below," "rightward," "leftward," "clockwise," and "counterclockwise" refer to directions in the drawings to which reference is made. As another example, terms such as "inward" and "outward" may refer to directions toward and away from, respectively, the geometric center of the component described. As a further example, terms such as "front," "rear," "side," "left side," "right side," "top," "bottom," "inner," "outer," "horizontal," and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Indeed, the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the invention, and in the invention generally. Moreover, the disclosure set forth herein includes the mirror image, i.e., mirror configuration, taken from any perspective of any drawing or other configuration shown or described herein. Accordingly, the preferred embodiments of the invention as set forth above are intended to be illustrative, not limiting. Various changes may be made without departing from the spirit and scope of the inventions as defined in the following claims.

What is claimed is:

1. A method of reduction of hydrogen sulfide levels in sour crude oil, comprising the steps of:
   providing a sparging gas at a defined pressure to a sparging assembly comprising
   a manifold and one or more gas spargers submerged within a mass of sour crude oil residing in a storage tank;
   monitoring hydrogen sulfide levels via a hydrogen sulfide concentration sensor located in a headspace of the storage tank;

causing a circulation fan to drive stripping gas into the headspace through a supply duct when hydrogen sulfide concentration levels in the headspace exceed a predetermined level; and directing a gaseous mixture from the headspace through a return duct coupled to an in-line filter, the gaseous mixture comprising the stripping gas, sparging gas, and excess hydrogen sulfide gas accumulating in the headspace.

2. The method of claim 1, wherein the one or more gas spargers extend radially outward from the manifold.

3. The method of claim 1, wherein the in-line filter comprises an outer casing containing a solid filtration medium.

4. The method of claim 3, wherein the solid filtration medium comprises ferrous oxide (FeO).

5. The method of claim 1, wherein the storage tank is located on a wheeled chassis, the wheeled chassis also comprising a crude oil transfer pump, a transfer connection, and a transfer valve.

6. The method of claim 5, wherein the storage tank comprising one or more curved sides, the storage tank having a long axis oriented with a direction of travel of the wheeled chassis.

7. The method of claim 6, wherein the manifold is oriented parallel to the long axis, and the one or more gas spargers extend upwardly from the manifold and are curved to conform to the sides of the storage tank.

8. The method of claim 7, wherein the manifold is coincident with the long axis, and the one or more gas spargers extend radially outward from the manifold toward the curved sides of the storage tank.

9. The method of claim 5, wherein the wheeled chassis is a truck trailer.

10. The method of claim 5, wherein the wheeled chassis is a rail car.

* * * * *